(12) United States Patent
Lutz

(10) Patent No.: US 6,908,109 B2
(45) Date of Patent: Jun. 21, 2005

(54) STEERING GEAR SHAFT FOR A STEERING COLUMN OF A MOTOR VEHICLE

(75) Inventor: Christian Lutz, Nüziders (AT)

(73) Assignee: ThyssenKrupp Presta Aktiengesellschaft, Eschen (LI)

( * ) Notice: Subject to any disclaimer, the term of this patent is extended or adjusted under 35 U.S.C. 154(b) by 59 days.

(21) Appl. No.: 10/388,011

(22) Filed: Mar. 13, 2003

(65) Prior Publication Data
US 2003/0173765 A1 Sep. 18, 2003

(30) Foreign Application Priority Data

Mar. 14, 2002 (DE) .......................... 102 11 743
Oct. 31, 2002 (EP) ............................ 02024231

(51) Int. Cl.⁷ ................................. B62D 1/11
(52) U.S. Cl. ........................................ 280/777
(58) Field of Search ................. 280/777; 74/492, 74/493; 188/371, 377

(56) References Cited

U.S. PATENT DOCUMENTS

| | | | |
|---|---|---|---|
| 3,508,633 A | | 4/1970 | Nishimura et al. |
| 3,577,621 A | | 5/1971 | De Gain |
| 4,531,619 A | * | 7/1985 | Eckels ............... 188/371 |
| 5,193,848 A | * | 3/1993 | Faulstroh ........... 280/775 |
| 5,368,330 A | * | 11/1994 | Arnold et al. ....... 280/777 |
| 5,562,306 A | * | 10/1996 | Rispeter ............. 280/775 |
| 5,626,363 A | * | 5/1997 | Rispeter ............. 280/775 |
| 5,983,695 A | | 11/1999 | Lutz |

FOREIGN PATENT DOCUMENTS

| | | | | |
|---|---|---|---|---|
| CH | 0324476 | | 9/1957 | |
| DE | 2027638 | | 12/1971 | |
| DE | 2459246 | | 6/1976 | |
| DE | 3224308 | | 12/1984 | |
| DE | 3446749 A1 | * | 7/1986 | ........... B62D/1/18 |
| DE | 2544769 | | 4/1997 | |
| DE | 9631214 | | 2/1998 | |
| EP | 0298832 | | 1/1989 | |
| EP | 0661117 | | 7/1995 | |
| EP | 0701070 | | 3/1996 | |
| EP | 0709274 | | 5/1996 | |
| EP | 0872401 | | 10/1998 | |
| JP | 0091671 | | 10/1983 | |

OTHER PUBLICATIONS

Patent Abstract of Japan JP-59 092254, May, 1984.
European Search Report.

* cited by examiner

Primary Examiner—Faye M. Fleming
(74) Attorney, Agent, or Firm—Sidley Austin Brown & Wood, LLP

(57) ABSTRACT

A steering gear shaft for a steering column of a motor vehicle has at least one crash-deformable section formed as a corrugated tube at least a portion of a longitudinal extent of which that contains at least one of corrugation crests of the corrugated tube, is formed of several layers, and plurality of openings is provided in a region of the at least one of the corrugation crests in at least one of the layers.

20 Claims, 3 Drawing Sheets

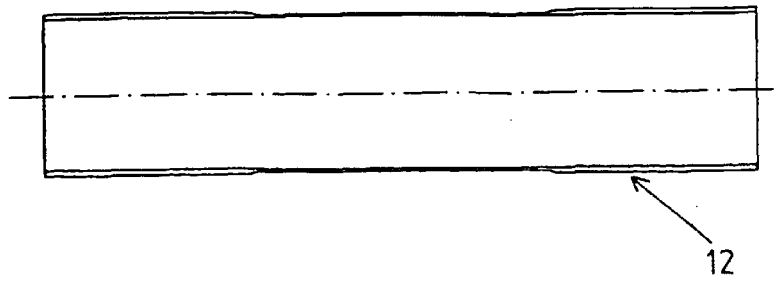
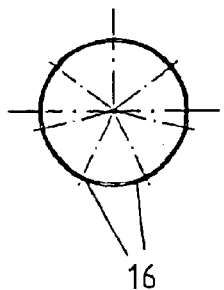
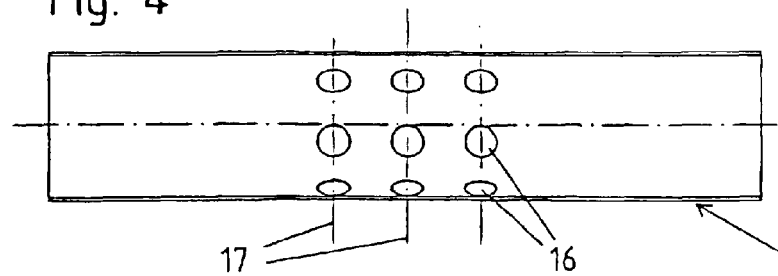
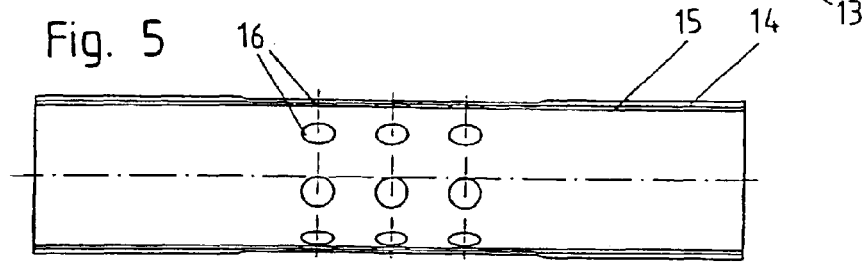
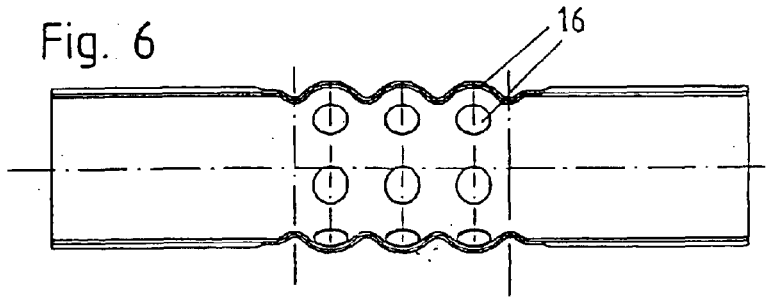
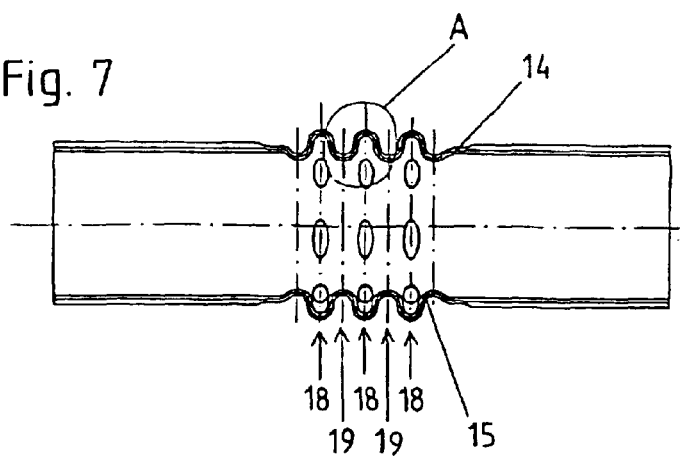

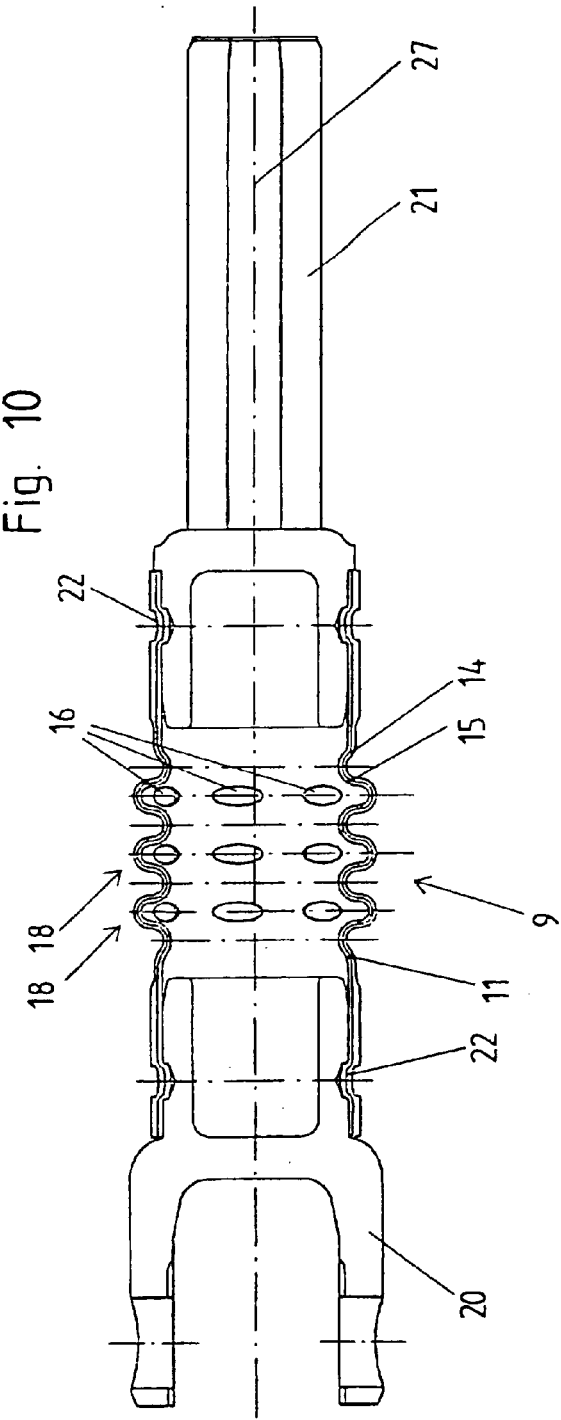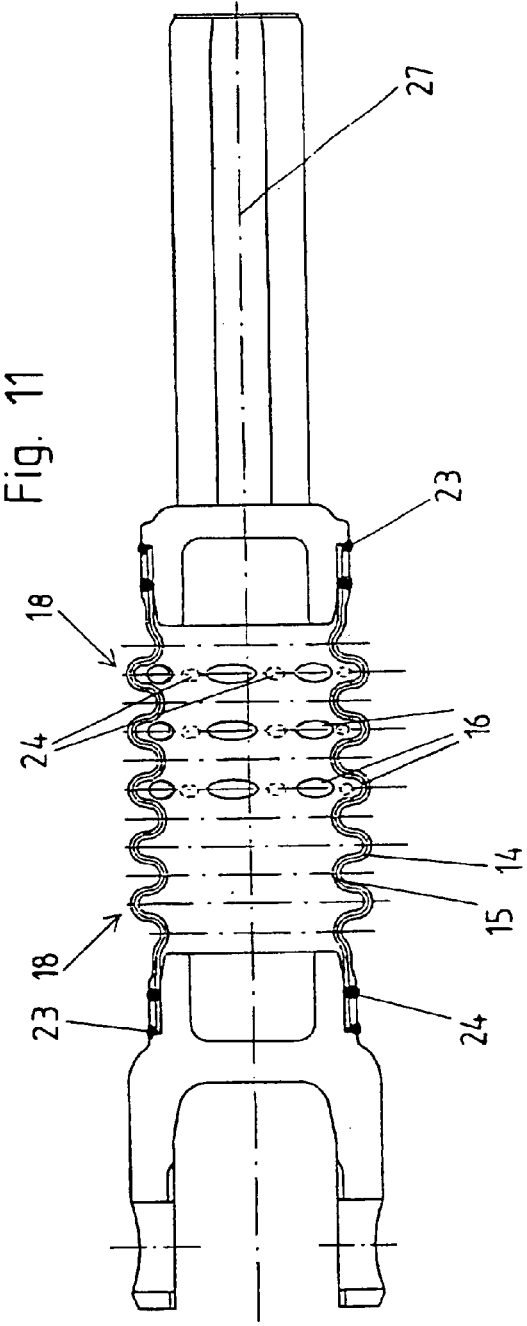

STEERING GEAR SHAFT FOR A STEERING COLUMN OF A MOTOR VEHICLE

BACKGROUND OF THE INVENTION

1. Field of the Invention

The present invention relates to a steering gear shaft for a steering column of a motor vehicle and having at least one crash-deformable section formed as a corrugated tube at least a portion of a longitudinal extent of which that contains at least one of corrugation crests of the corrugation tube, is formed of several layers.

2. Description of the Prior Art

Steering gear shafts of steering columns with deformable sections formed as corrugated tubes are disclosed, e.g., in German Publication DE-196 31 214 A and European Publications EP-0 709 274A1, EP-0 872 401A2, and EP-0 701 070A1. Corrugated tubes, which form the crash-deformable sections, can be arranged in different sections of a steering column. In a steering column, a single corrugated tube can be used or several corrugated tubes can be arranged in different section of the steering column. The corrugated tubes, which function as crash-deformable sections, are compressed axially, on one side, and can be bent sideways under the action of non-axial forces, on the other side.

Different methods of manufacturing of corrugated tubes, which function as crash-deformable sections, are known. Such methods are disclosed, e.g., in European Publication EP-661 117A1, EP-298 832B1, EP-0 782 891 A1, and in German Publication DE-20 27 638A1. A corrugated tube for a steering column, which functions as a crash-deformable section, should meet specific requirements. On one hand, it should be easily deformable in case of a crash to be able to perform its function, with the deformation taking place in a predetermined manner. On the other hand, it should be able to withstand loads acting thereon during a normal operation over its entire service life. Therefore, the corrugated tube should meet very high requirements which should be determined by extensive tests. These test should examine, among others, the stability under the action of torques of predetermined values and under action of static, dynamic, and pulsatory loads. Further, the deformation behavior should be tested. In addition to meeting all of these different requirements, the corrugated tubes have to have as small dimensions as possible for space-saving reasons.

In order to provide for manufacture of corrugated tubes capable of meeting the requirements for crash-deformable section, European Publication EP-0 82 891A1 discloses a method of manufacturing of such corrugated tubes according to which the wall thickness in the region of corrugation trough is increased in comparison with the wall thickness in the region of the corrugation crests. In the region of the corrugation troughs greater loads act on the corrugated tube during transmission of a torque because it is in this region, the wall of the corrugated tube has a smallest distance from the central axis of the corrugated tube.

DE-20 27 638A1 discloses a method of manufacturing of a radially corrugated tube according to which a uniform wall thickness, different wall thickness and/or profile of a corrugated tube can be obtained from shaft to shaft or zonewise. Thereby, a corrugated tube, which functions as a crash-deformable section of a steering gear shaft and having different collapsible zones can be produced.

German Patent DE-32 24 308C2 and Swiss Patent No. 324,476 disclose a corrugated multi-layer metal bellows which is used as a portion of liquid or gas conduits, in particular, for sealingly connecting movable relative to each other, parts. The German and Swiss Patents relate to field remote from and not comparable with steering columns for motor vehicles. They solve different problem and relate to products which have to meet different requirements.

A multi-layer corrugated tube is also disclosed in German Publication DE-25 44 769A1. With the multi-layer, e.g., two-layer corrugated tube, the stability of the tube under the action of a torque acting thereon about its longitudinal axis does not change or changes very little in comparison with conventional, single-layer tube with the same wall thickness, whereas the deformation, in particular, a sideway buckling under the action of non-axial forces takes place when the acting non-axial forces are noticeably smaller. This result in improved crash characteristics in comparison with conventional steering columns during the transmission of high torque. At that, the outer diameter of the corrugated tube can be reduced.

An object of the invention is a steering gear shaft of the type described above and having at least one crash-deformable section formed as a corrugated tube having improved rigidity under the action of a torque acting about the tube longitudinal axis and adequate deformability in case of a crash.

SUMMARY OF THE INVENTION

This and other objects of the present invention, which will become apparent hereinafter, are achieved by providing, in a steering gear shaft of the type discussed above, a plurality of openings in a region of the at least one of the corrugation crests in at least one of the layers.

Because the corrugation crests are subjected to less stress during transmission of a torque acting about the tube longitudinal axis as they are being spaced by a greater distance from the longitudinal axis, a crash-deformable section-forming, corrugated tube having improved deformation characteristics with an adequate stability under the torque action is produced. In particular, such a tube is easily bendable under the action of non-linear forces.

The novel features of the present invention, which are considered as characteristic for the invention, are set forth in the appended claims. The invention itself, however both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show:

FIG. 3. a schematic view illustrating a first step of manufacturing of a corrugated tube for a steering gear shaft according to the present invention;

FIG. 4 a schematic view illustrating a second step of manufacturing of a corrugated tube for a steering gear shaft according to the present invention;

FIG. 5. a schematic view illustrating a third step of manufacturing of a corrugated tube for a steering gear shaft according to the present invention;

FIG. 6 a schematic view illustrating a fourth step of manufacturing of a corrugated tube for a steering gear shaft according to the present invention;

FIG. 7 a schematic view illustrating a fifth step of manufacturing of a corrugated tube for a steering gear shaft according to the present invention;

FIG. 8 a cross-sectional view of the corrugated tube shown in FIG. 4;

FIG. 10 a longitudinal cross-sectional view of a section of a steering gear shaft according to the present invention having a deformable portion formed as a corrugated tube;

FIG. 11 a longitudinal cross-sectional view of a section of a steering gear shaft according to another embodiment of the present invention having a deformable portion formed as a corrugated tube;

DETAILED DESCRIPTION OF THE PREFERRED EMBODIMENTS

Figure 1:
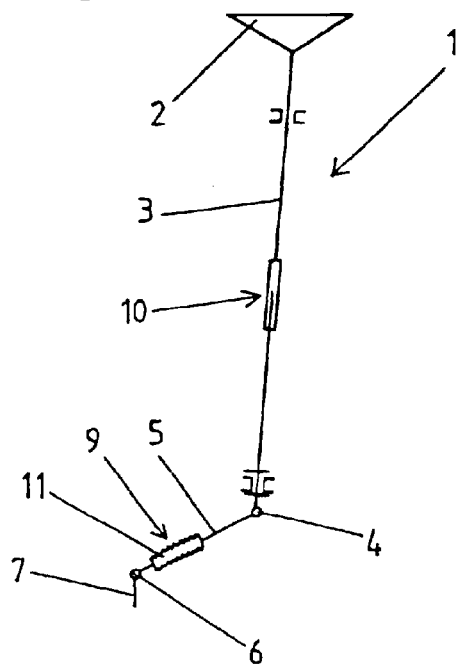
FIG. 1. a schematic view of a first embodiment of a steering column.
Figure 2:
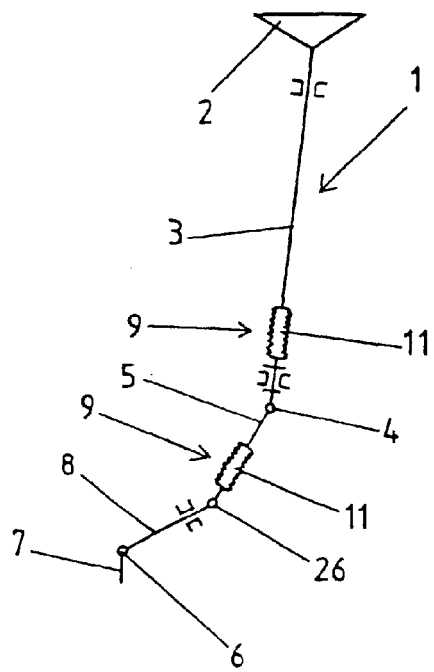
FIG. 2. a schematic view of a second embodiment of a steering column.
Figure 9:
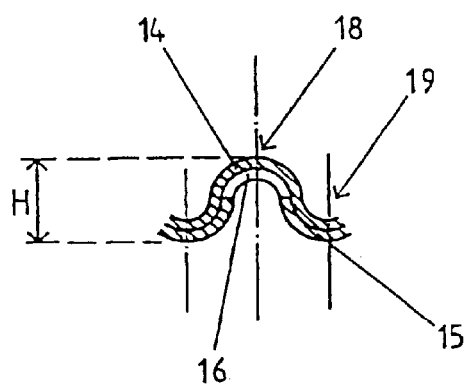
FIG. 9 a cross-sectional view of the corrugated tube shown in FIG. 7.

FIGS. 1 and 2 show schematically two different embodiments of a steering column 1. In the embodiment shown in FIG. 1, first portion 3 of a steering gear shaft, which adjoins a steering wheel 2, is connected with a second portion 5 of the steering gear shaft by a hinged connection 4 in form of a universal joint. The second portion 5 is also called an intermediate shaft that eventually includes a shock absorber. The second portion 5 is further connected with a pitman arm pin 7 by a hinged connection 6.

In the embodiment of a steering column 1 shown in FIG. 2, a further steering gear shaft portion 8 is provided between the second portion 5 of the steering gear shaft and the pitman arm pin 7. The further third portion 8 is connected with the second portion 5 by a hinged connection 26. The hinged connections 6 and 26 are also formed as a universal joints. The support for the steering gear shaft and the suspension of the steering column on a chassis, which is adjustable in per se known manner, are not shown in detail in FIGS. 1–2 and can be effected in a conventional manner. The inventive steering gear shaft can be also formed differently, i.e., it can have more or less portions 3, 5, and 8.

At least one of the portions 3, 5, and 8 of the steering gear shaft is provided with a section 9, 10 deformable in case of a crash. At least one of the deformable sections 9, 10 is formed as a corrugated tube 11. In addition to the deformable section 9 formed as the corrugated tube 11, the further section 10 can be provided with its length being shortened in another way. e.g., the section 10 can be formed of two telescopic tubes pushed into each other and which, in case of a crash, are axially displaced into each other. The use of tubes telescopically displacing into each other is well known. There can be provided one or more deformable sections 9 formed each as the corrugated tube 11 and arranged in one or more of portions 3, 5, and 8 of the steering column shaft.

A possible process of forming a corrugation tube for a steering column shaft according to the present invention will be briefly explained with reference to FIGS. 3–9 which show consecutive steps of the forming of a corrugation tube. The corrugation tube is formed of two layers over its entire length, with the tube 12, which forms an outer layer 14, having a closed outer surface. A tube 13, which forms an inner layer 15, has, in its finished condition, a plurality of openings 16. The openings 16 are arranged, in the finished condition of the tube 13, along imaginary circumferential lines 17 on which in a finished corrugated tube, peaks of the corrugation crests lie, in a spaced relationship to each other. E.g., along each imaginary circumferential line 17, there can be provided, e.g., seven, equidistantly circumferential spaced from each other, openings 16 which, in the embodiment shown in the drawings, have a circular shape. The tube 12 is slided over the tube 13, as shown in FIG. 5. Then, the inner tube 13 can be expanded by an expanding mandrel so that both layers 14, 15 closely abut each other.

Then, the corrugations are formed, e.g., by a multistage process, as illustrated in FIGS. 6–7. The tubular wall is provided with a corrugation with the use of shaped tools having a respective corrugation and which are pressed against the tubular wall from inside and outside. For forming a required corrugation, several sets of shaped tools having an increased corrugation depth are used. Then, a tube, which has a shape shown in FIG. 6, is axially compressed, with the tube being supported on a mandrel and with cheek plates being inserted in separate corrugation troughs from outside and displaced, as a result of application of a force, axially toward each other. In the finished tube shown in FIG. 7, a plurality of openings 16 is provided in the region of corrugation crests 18 in the inner layer (tube 13) 15. In the embodiment produced as shown in FIGS. 3–7, all of the corrugation crests have a plurality of openings 16. Advantageously, the corrugation troughs 19 are free from openings 16 (see FIG. 9) at least up to one/fourth of a height H between the corrugation troughs 19 and corrugation crests 18. The closed outer layer 14 prevents, e.g., penetration of a corrosive salt water.

Then, the finished corrugated tube can be arranged in the portion 3, 5 and/or 8 of the steering gear shaft. The corrugated tube 11 can be connected, at one of its ends, with a joint yoke 20, and with a shaft 21 at its other opposite end, as shown in FIG. 10. The corrugated tube 11 is connected formlockingly with the joint yoke 20 and the shaft 21 by knobs 22 engaging in corresponding recesses in the joint yoke 20 and the shaft 21. The knobs 22 prevent both layers 14, 15 of the corrugated tube from displacement in a circumferential direction. Instead, of knobs 22, other forms of formlocking connections can be used, in particular, a press fit connection can be used or a toothing connection.

In the embodiment shown in FIG. 11, the corrugated tube 11 is connected with the joint yoke 20 and the shaft 21 by welds 23 and/or welds 24. The welds 23 and/or 24 also can connect the two layers 14, 15. The welds 23, away from the universal joints 6, 26. Thereby, the corrugated tube will be more deflection-resistant in the region adjacent to the adjacent universal joint 26, 6, where the bending forces are greatest, because the corrugation height H is smaller in this region.

Figure 12:
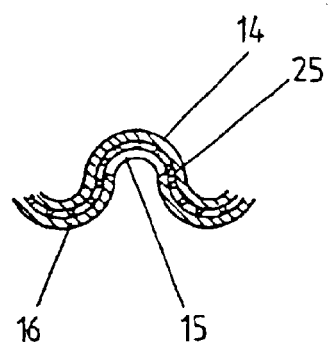
FIG. 12 a view similar to that of FIG. 9 of another embodiment of a corrugated tube.
Figure 13:
FIG. 13 a schematic view of a middle section of a wall of a corrugated tube with regions having different thicknesses.
Figure 14:
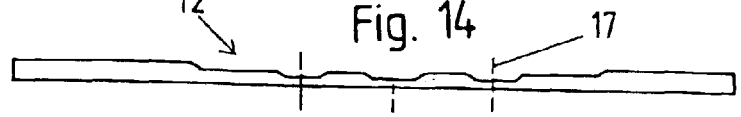
FIG. 14 a view similar to that of FIG. 13 of another embodiment of a corrugated tube.
Figure 15:
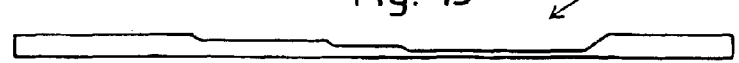
FIG. 15 a view similar to that of FIGS. 13–14 of a further embodiment of a corrugated tube.

It is possible to form the two or more layers 14, 15 of the corrugation tube 11 of different materials. Thus, the outer layer 14 can function as a heat shield, and an intermediate material, e.g., in form of a metal mesh or a wire grate 25 (see FIG. 12) can be provided between the outer layer 14 and an inner layer 15 that can be formed from a comparatively low-cost material. To provide for corrosion protection an additional comparatively thin, outer layer can be provided. This layer can be formed of a stainless steel. Generally, all of the layers of a corrugation tube can be formed of a stainless steel.

A multi-layer formation of a corrugated tube can be provided only along a portion of its longitudinal extent, e.g., over the corrugated portion of its longitudinal extent at least a portion of a longitudinal extent of a corrugated tube that has at least one of corrugation crests of the tube, can be formed of several layers. Advantageously, the openings 16 are provided at least in or only in this region of the corrugation tube. Though a two-layer formation is advantageous, one- or three-layer formation of the corrugation tube is also possible. With a three-layer formation, the thickness of separate layers can lie. e.g., in a region of 0.4 mm.

The formation of the steering gear shaft according to the present invention permits to adapt it to loads occurring during its normal operation, on one hand, and to specific predetermined crash requirements on the other hand.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A steering gear shaft for a steering column of a motor vehicle, comprising at least one crash-deformable section formed as a corrugated tube at least a portion of a longitudinal extent of which that contains at least one of corrugation crests of the corrugation tube and which is formed of several layers; and a plurality of openings provided in a region of the at least one of the corrugation crests in at least one of the layers, wherein a universal joint is provided at least at one end of the corrugated tube, and wherein a wall thickness of at least one of the layers diminishes, over a region of the corrugation crests and corrugation troughs, from a side of the corrugated tube adjacent to the universal joint to a side of the corrugated tube remote from the universal joint.

2. A steering gear shaft for a steering column of a motor vehicle, comprising at least one crash-deformable section formed as a corrugated tube at least a portion of a longitudinal extent of which that contains at least one of corrugation crests of the corrugation tube and which is formed of several layers; and a plurality of openings provided in a region of the at least one of the corrugation crests in at least one of the layers, wherein a wall thickness of at least one of the layers, at least in the region of the at least one of the corrugation crests, is smaller than a wall thickness of an adjacent corrugation trough.

3. A steering gear shaft as set forth in claim 2, wherein a wall thickness of at least one of the layers, at least in the region of the at least one of the corrugation crests, is smaller than a wall thickness of an adjacent corrugation trough.

4. A steering gear shift for a steering column of a motor vehicle, comprising at least one crash-deformable section formed as a corrugated tube at least a portion of a longitudinal extent of which that contains at least one of corrugation crests of the corrugation tube and which is formed of several layers; and a plurality of openings provided in a region of the at least one of the corrugation crests in at least one of the layers, wherein a height of corrugations changes over the corrugated region, wherein a universal joint is provided at least at one end of the corrugated tube, and wherein a distance of a corrugated trough, which is located more closely to the universal joint, from a longitudinal axis of the corrugation tube is greater than a distance from the longitudinal axis of the corrugation tube of a corrugation trough located farther away from the universal joint.

5. A steering gear shaft for a steering column of a motor vehicle, comprising a first portion adjoining a steering wheel; at least one second portion remote from the steering wheel; a universal joint connecting the first portion and the at least one second portion; at least one crash-deformable section provided in the at least one second portion and formed as a corrugated tube at least a portion of a longitudinal extent of which that contains at least one of corrugation crests of the corrugated tube is formed of at least two layers; and plurality of openings is provided in a region of the at least one of the corrugation crests in at least one of the layers, wherein a corrugation trough, which is associated with the at least one of the corrugation crests, is free from openings at least up to one/fourth of a height between the corrugation trough and the at least one of the corrugation crests.

6. A steering gear shaft as set forth in claim 5, wherein at least a portion of the longitudinal extent of the corrugated tube, in which the corrugation crests and corrugation troughs are provided, is formed of the several layers.

7. A steering gear shift as set forth in claim 6, wherein the corrugated tube is formed of the several layers along an entire longitudinal extent thereof.

8. A steering gear shaft as set forth in claim 5, wherein the plurality of openings is provided in the at least one of the corrugation crests in a spaced relationship to each other.

9. A steering gear shaft as set forth in claim 5, wherein each of the corrugation crests is provided with spaced from each other openings in the at least one of the layers.

10. A steering gear shaft as set forth in claim 5, wherein a universal joint is provided at least at one end of the corrugated tube, and wherein a corrugation crest adjoining the at least one end of the corrugated tube is free from any openings.

11. A steering gear shaft as set forth in claim 10, wherein several corrugation crests adjoining the at least one end of the corrugated tube are free from any openings.

12. A steering gear shaft as set forth in claim 5, wherein the openings are formed in the innermost layer, and an adjacent outer layer is circumferentially closed.

13. A steering gear shaft as set forth in claim 5, wherein the corrugated tube is formed of two layers, wherein the openings are provided in both layers, and the openings, which are formed in the outer layer, are offset with respect to the openings of the inner layer so that the openings in the outer layer are closed from inside of the tube.

14. A steering gear shaft as set forth in claim 5, wherein the layers are made of different materials.

15. A steering gear shaft as set forth in claim 14, wherein the outer layer is one of formed of a corrosion-resistant material and has a corrosion-proof coating.

16. A steering gear shaft as set forth in claim 14, wherein the outer layer is formed of stainless steel.

17. A steering gear shaft as set forth in claim 14, wherein the outer layer is formed of a heat-resistant material.

18. A steering gear shaft as set forth in claim 5, wherein the several layers consist of two layers, and wherein a spacing material is provided between the two layers.

19. A steering gear shaft as set forth in claim 18, wherein the spacing material is formed of one of metal mesh and wire grate.

20. A steering gear shaft as set forth in claim 5, wherein the at least two layers are both corrugated layers closely abutting each other.

* * * * *